US010556662B2

United States Patent
Fink et al.

(10) Patent No.: US 10,556,662 B2
(45) Date of Patent: Feb. 11, 2020

(54) ROTARY WING AIRCRAFT WITH A FUSELAGE THAT COMPRISES AT LEAST ONE STRUCTURAL STIFFENED PANEL

(71) Applicant: AIRBUS HELICOPTERS DEUTSCHLAND GMBH, Donauworth (DE)

(72) Inventors: Axel Fink, Donauworth (DE); Andreas Rack, Burghausen (DE); Helmut Fietz, Tapfheim (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 420 days.

(21) Appl. No.: 15/656,280

(22) Filed: Jul. 21, 2017

(65) Prior Publication Data

US 2018/0043982 A1    Feb. 15, 2018

(30) Foreign Application Priority Data

Aug. 11, 2016   (EP) ..................... 16400035

(51) Int. Cl.
*B64C 1/06* (2006.01)
*B64C 1/40* (2006.01)
(Continued)

(52) U.S. Cl.
CPC .............. *B64C 1/061* (2013.01); *B64C 1/064* (2013.01); *B64C 1/12* (2013.01); *B64C 1/40* (2013.01);
(Continued)

(58) Field of Classification Search
CPC ........... B64C 1/061; B64C 1/064; B64C 1/12; B64C 1/068; B64C 1/40;
(Continued)

(56) References Cited

U.S. PATENT DOCUMENTS 2,819,032 A * 1/1958 Detrie ....................... E04B 1/74
                                                         244/119
3,058,704 A   10/1962 Bergstedt
(Continued)

FOREIGN PATENT DOCUMENTS

EP   2660048     11/2013
FR   3017235     8/2015
(Continued)

OTHER PUBLICATIONS

European Search Report for European Application No. EP 16400035, Completed by the European Patent Office on Jan. 25, 2017, 6 Pages.

*Primary Examiner* — Medhat Badawi
(74) *Attorney, Agent, or Firm* — Brooks Kushman P.C.

(57) ABSTRACT

A rotary wing aircraft with a fuselage that comprises at least one structural stiffened panel, the structural stiffened panel comprising a stressed skin and a stiffening framework that is rigidly attached to the stressed skin, wherein the stressed skin comprises an inner skin, an outer skin and a core element assembly that is arranged between the inner skin and the outer skin, the core element assembly comprising at least one viscoelastic core element and at least one intermediate core element that are tessellated, wherein the at least one viscoelastic core element is provided for noise and vibration damping.

20 Claims, 3 Drawing Sheets

(51) Int. Cl.
*B64C 1/12* (2006.01)
*B64C 27/04* (2006.01)
*B64C 1/00* (2006.01)

(52) U.S. Cl.
CPC ...... *B64C 27/04* (2013.01); *B64C 2001/0072* (2013.01); *Y02T 50/46* (2013.01)

(58) Field of Classification Search
CPC . B64C 2001/0072; B64C 27/04; B29C 70/68; B29D 24/005; B32B 37/18; Y02T 50/46
See application file for complete search history.

(56) References Cited

U.S. PATENT DOCUMENTS

| | | | | |
|---|---|---|---|---|
| 3,071,217 A * | 1/1963 | Gould | ................ | B64C 1/40 52/403.1 |
| 3,817,256 A * | 6/1974 | Buchele | ................ | A01F 11/06 460/46 |
| 3,817,356 A * | 6/1974 | Dahlquist | ................ | F16F 9/306 188/268 |
| 4,235,398 A * | 11/1980 | Johnson | ................ | B32B 3/12 244/119 |
| 4,635,882 A * | 1/1987 | SenGupta | ................ | B64C 1/06 188/378 |
| 5,407,548 A * | 4/1995 | Kopacz | ................ | C23C 14/0036 204/192.15 |
| 5,510,012 A * | 4/1996 | Schulz | ................ | C23C 14/14 204/192.15 |
| 6,155,932 A * | 12/2000 | Cabales | ................ | A63B 53/10 473/319 |
| 6,179,031 B1 * | 1/2001 | Rack | ................ | B29C 66/452 118/50.1 |
| 6,287,664 B1 * | 9/2001 | Pratt | ................ | B29C 70/20 428/68 |
| 8,479,876 B2 * | 7/2013 | Fetsko | ................ | B60R 13/08 181/207 |
| 8,512,848 B2 * | 8/2013 | Reichwein | ................ | B32B 3/10 428/156 |
| 8,703,275 B2 * | 4/2014 | Reichwein | ................ | E04F 15/02038 428/156 |
| 9,640,166 B2 * | 5/2017 | Simon | ................ | B64C 1/40 |
| 9,657,722 B2 * | 5/2017 | Wagner | ................ | E04H 12/12 |
| 9,888,676 B2 * | 2/2018 | Schwartz | ................ | A01K 85/01 |
| 2004/0048022 A1 * | 3/2004 | Pratt | ................ | A63B 60/00 428/36.91 |
| 2004/0155148 A1 * | 8/2004 | Folkesson | ................ | B32B 5/18 244/119 |
| 2008/0111024 A1 * | 5/2008 | Lee | ................ | B64C 1/068 244/121 |
| 2009/0217529 A1 * | 9/2009 | Cerezo | ................ | B29C 70/34 29/897.2 |
| 2013/0092792 A1 * | 4/2013 | Oldroyd | ................ | B29C 66/5221 244/119 |
| 2014/0170372 A1 * | 6/2014 | Fink | ................ | B32B 3/12 428/116 |
| 2014/0170373 A1 * | 6/2014 | Fink | ................ | B29C 70/68 428/116 |
| 2014/0331473 A1 * | 11/2014 | Smith | ................ | B64F 5/50 29/429 |
| 2015/0030806 A1 * | 1/2015 | Fink | ................ | B32B 3/12 428/116 |
| 2015/0118436 A1 * | 4/2015 | Fink | ................ | B29D 99/0014 428/71 |
| 2015/0307178 A1 * | 10/2015 | Fink | ................ | B64C 1/061 244/119 |
| 2016/0001869 A1 * | 1/2016 | Jorn | ................ | B64C 1/068 244/119 |
| 2016/0185437 A1 * | 6/2016 | Arevalo Rodriguez | ................ | B64C 1/068 244/119 |
| 2016/0375979 A1 * | 12/2016 | Von-Wilmowsky | ................ | B64C 1/00 244/17.17 |
| 2017/0341322 A1 * | 11/2017 | Joachim | ................ | B29C 73/105 |
| 2018/0022433 A1 * | 1/2018 | Fink | ................ | B64C 1/061 244/119 |
| 2018/0043982 A1 * | 2/2018 | Fink | ................ | B64C 1/061 |
| 2018/0085782 A1 * | 3/2018 | Rack | ................ | B64C 1/12 |
| 2018/0327911 A1 * | 11/2018 | Rack | ................ | B32B 27/08 |
| 2019/0241245 A1 * | 8/2019 | Rack | ................ | B32B 3/06 |

FOREIGN PATENT DOCUMENTS

| | | |
|---|---|---|
| WO | 8102718 | 10/1981 |
| WO | 02098734 | 12/2002 |

* cited by examiner

ROTARY WING AIRCRAFT WITH A FUSELAGE THAT COMPRISES AT LEAST ONE STRUCTURAL STIFFENED PANEL

CROSS-REFERENCE TO RELATED APPLICATIONS

This application claims priority to European patent application No. EP 16400035.8 filed on Aug. 11, 2016, the disclosure of which is incorporated in its entirety by reference herein.

BACKGROUND OF THE INVENTION

(1) Field of the Invention

The invention is related to a rotary wing aircraft with a fuselage that comprises at least one structural stiffened panel, the structural stiffened panel comprising a stressed skin and a stiffening framework that is rigidly attached to the stressed skin.

(2) Description of Related Art

More generally, such structural stiffened panels, which are of the so-called skin-stiffened design and conventionally applied in semi-monocoque designs, usually comprise a thin skin which is supported by a discrete back structure composed of discrete structural elements, such as longitudinal stiffeners—typically called stringers—and transverse intermediate stiffeners—typically defined by frames. The discrete back structure, i.e. the stringers and frames, defines the stiffening framework, wherein the stringers absorb a considerable portion of longitudinal loads that are occurring in operation.

Usually, respective stringers are bonded or riveted to the stressed skin and, in composite designs, they can also be co-cured, i.e. simultaneously cured, with the stressed skin. Respective frames are usually riveted to the stressed skin and onto the stringers, and exhibit a height that is greater than a respective height of the stringers. Accordingly, the stringers are continuous and pass through the frames. The latter show local cut-outs in order to allow the stringers of the structural stiffened panel to pass there through.

However, in a rotary wing aircraft with a fuselage that comprises such a structural stiffened panel, at least free sections of the stressed skin that are arranged between the stringers and frames and that are delimited by the stringers and frames, thereby forming so-called bays, usually exhibit comparatively small thicknesses and are prone of being excited by a dynamic behavior of the rotary wing aircraft in operation, thus, contributing noticeably to noise radiation, especially within mid and high audio frequency ranges. As improvement of acoustic and noise emission characteristics is a continuous ambition in aviation as such, incessant attempts are made to reduce the noise radiation and, more generally, to improve the vibro-acoustic behavior of rotary wing aircrafts.

Conventionally, several techniques are available to contribute to an improvement of the vibro-acoustic behavior of rotary wing aircrafts. For most techniques, vibration and noise can be controlled by use of passive methods, like vibration insulation and structural damping, both being, however, related to secondary non-load-carrying elements which, nevertheless, negatively affect an underlying weight efficiency of a given rotary wing aircraft.

More specifically, the vibro-acoustic behavior of an aircraft airframe, such as a fuselage of a rotary wing aircraft that comprises structural stiffened panels, is best controlled at its source, i.e. at the structural stiffened panels, by means of structural damping approaches. By improving respective damping characteristics of the structural stiffened panels, vibrational energy can be dissipated within the structural stiffened panels before it can be build up and radiate as noise. Adequate materials can be applied to the structural stiffened panels so as to increase their ability to dissipate energy when being subjected to vibration.

Conventional approaches are based on adding soundproofing materials to the structural stiffened panels and/or a respective cabin lining, such as adhesive damping patches or pads or fiberglass insulating mats. Adhesive damping patches or pads are add-on patches or pads that are bonded onto respective surfaces of the structural stiffened panels that are prone to vibration, e.g. the above-described bays. The adhesive damping patches or pads are usually composed of a viscoelastic material alone or in combination with a covering sheet and implemented e.g. as free elastomeric rubber layers. The viscoelastic material exhibits an intrinsic elastic hysteresis behavior during loading and unloading cycles, which results in dissipation of mechanical energy as an effect of the material's internal friction.

The document U.S. Pat. No. 3,058,704 A describes use of such damping patches or pads. The document U.S. Pat. No. 8,479,876 B2 also describes use of such damping patches or pads, which are, however, not particularly applied to an aircraft airframe, such as a fuselage of a rotary wing aircraft that comprises structural stiffened panels. Instead, they are provided for a local vehicle application on a structural, non-stiffened element of a vehicle in general and exhibit a special shaping in order to improve formability of an overall assembly. Furthermore, use of viscoelastic material for damping purposes is generally known, e.g. from the documents EP 2 660 048 A1 and U.S. Pat. No. 3,817,256 A.

However, such add-on patches or pads are usually directly applied to an underlying structure, i.e. directly to the structural stiffened panels and, more specifically, to free surfaces of the structural stiffened panels, such as the bays described above. This enables a simple empiric approach on a respective setting of adequate locations, where the add-on patches or pads are bonded, but finally implies additional weight. The add-on patches or pads are usually not considered as load carrying and stabilizing members for the fuselage as such.

Furthermore, a respective covering ratio of such add-on patches or pads is less than 100%, thus, leading to a noticeable loss of noise insulation efficiency. The covering ratio defines the surface of the given panel that is covered by the add-on patches or pads. More specifically, structural stiffened panels usually comprise multiple stiffening members, i.e. stringers and frames, which are riveted to a given stressed skin, e.g. a stressed monolithic skin. Therefore, use of local add-on patches or pads at each bay would not only lead to a comparatively low covering ratio, but also to a comparatively high additional weight.

Moreover, respective external surfaces of a given structural stiffened panel must be locally pre-treated prior to application of add-on patches or pads in order to allow for a subsequent bonding of the add-on patches or pads, which leads to additional costs and increased lead time. Finally, respective borders and edges of the add-on patches or pads must be adequately protected against environmental effects in order to ensure durability.

In contrast thereto, i. e. in case of viscoelastic material being sandwiched as a viscoelastic layer between two stiff layers of a given panel in general, mechanical energy is dissipated once the given panel is subjected to transverse loads and transverse movements, the transverse loads generating transverse shear stresses and strains within the viscoelastic layer. Therein, the mechanical energy dissipation arises from shear deformations of the viscoelastic layer. This so-called constrained layer damping effect is much more effective compared to the damping effect obtained by means of the above-described free viscoelastic rubber layer being just applied onto respective surfaces of the structural stiffened panels that are prone to vibration.

More specifically, an underlying effectiveness of the constrained layer damping effect is strongly dependent on respective characteristics of an applied viscoelastic material and the viscoelastic layer's thickness, as well as a corresponding thickness and elastic moduli of respective constraining layers, i. e. the two stiff layers of the given panel, and also depends on a respective coverage ratio of the given panel. In this case, the coverage ratio defines the surface of the given panel that is covered by the viscoelastic layer. It should, nevertheless, be noted that environmental effects, such as e. g. a respective operating temperature, also affect underlying damping characteristics.

By way of example, the document U.S. Pat. No. 3,071,217 A describes a corresponding damped arrangement of a structural stiffened panel with a layer of viscoelastic material, which is applied between an outer skin and an inner skin of a given stressed skin in the region of an associated stiffening framework. This approach is, nevertheless, unfeasible in practice due to a required riveting through the layer of viscoelastic material, which is prone to pre-tension loss due to relaxation and fretting fatigue issues. More generally, riveting of structural stiffened panels, i. e. of stiffeners and frames to an assembly of a stressed skin with an integrated viscoelastic layer is deemed unfeasible due to a significant loss of tightening load due to relaxation of the viscoelastic layer and an axial micro-movement of respective rivets.

It should be noted that also various other approaches exist for improving the vibro-acoustic behavior of structural stiffened panels and, more generally, of reinforced skin structures that are prone to vibration and noise generation in operation. For instance, the document U.S. Pat. No. 4,635,882 A describes an approach of providing noise attenuation of a structural stiffened panel, which is based on an interconnection of distant flanges of a given stringer of the structural stiffened panel by means of layers of viscoelastic material. The document WO 81/02718 A1 in turn describes vibration damping of structural stiffening elements, such as frames in an aircraft fuselage, by means of viscoelastic constraining layers that are rigidly attached to two transverse faces of the structural stiffening element. Furthermore, the document U.S. Pat. No. 4,235,398 A describes a trim panel design acting as insulation device between the fuselage and an aircraft cabin, adding additional non-load-carrying mass to the aircraft.

Still another approach for improving the vibro-acoustic behavior of structural stiffened panels is described in the document EP 1 399 362 A1, according to which a structural stiffened panel of an aircraft comprises a sandwiched skin and stiffening frames that are rigidly attached to the sandwiched skin The stressed skin comprises an inner skin of aluminum, an outer skin of aluminum and a core material that is arranged between the inner skin and the outer skin. The core material includes a lightweight aluminum foam core and a reinforcement grid of aluminum, which includes longitudinal and transversal grid members. The longitudinal grid members define stringers, so that provision of separate stringers can be omitted such that an overall weight of the structural stiffened panel can be reduced. Furthermore, weakening cut-outs in the frames that would otherwise be required for such separate stringers can be avoided, thereby strengthening the structural stiffened panel as a whole.

Other structural stiffened panels are described in the documents U.S. Pat. Nos. 3,817,356 A, 3,058,704 A and 2,819,032 A. However, none of these documents describes noise and vibration damping by means of a viscoelastic core element.

In summary, use of structural stiffened panels in aircrafts in general is a well-known measure and use of viscoelastic material for noise and vibration damping in general is also a well-known measure. However, there is currently no structural arrangement for use in a rotary wing aircraft available that combines a structural stiffened panel with a viscoelastic material such that structural weight efficiency as well as noise and vibration damping efficiency thereof are simultaneously improved.

BRIEF SUMMARY OF THE INVENTION

It is, therefore, an object of the present invention to provide a new rotary wing aircraft with a fuselage that comprises a structural stiffened panel having an increased structural weight efficiency and improved noise and vibration damping characteristics.

This object is solved by a rotary wing aircraft with a fuselage that comprises at least one structural stiffened panel, the structural stiffened panel comprising the features of claim 1.

More specifically, according to the present invention the rotary wing aircraft with a fuselage comprises at least one structural stiffened panel, wherein the structural stiffened panel comprises a stressed skin and a stiffening framework that is rigidly attached to the stressed skin. The stressed skin comprises an inner skin, an outer skin and a core element assembly that is arranged between the inner skin and the outer skin. The core element assembly comprises at least one viscoelastic core element and at least one intermediate core element that are tessellated. The at least one viscoelastic core element is provided for noise and vibration damping.

According to one aspect, the inventive rotary wing aircraft comprises a fuselage with at least one structural stiffened panel that is adapted to enable both, structural weight efficiency on the one hand and an effective noise and vibration damping on the other hand. Both items are of crucial importance for acceptance of a rotary wing aircraft in terms of its economic viability and comfort, but also for aircrafts in general.

More specifically, the most relevant source of noise in a rotary wing aircraft is based on mid to high audio frequencies arising within respective dynamic systems, and more particularly, within a respective transmission gear box. A corresponding severity of a respective acoustic impact on a cabin of the rotary wing aircraft is particularly pronounced for rotary wing aircrafts having a transmission gear box installed on top of a fuselage and very close to the cabin, which corresponds to a standard architectural arrangement for current helicopters.

Advantageously, the inventive rotary wing aircraft comprises a fuselage with at least one structural stiffened panel having a design that is provided considering modified elastic properties of the stressed skin and a contribution of the intermediate core element to an underlying longitudinal stiffness of the structural stiffened panel and the stringers of the stiffening framework, especially for an overcritical design of the structural stiffened panel. More specifically, use of adhesive damping patches or pads, which are bonded to a respective load-carrying skin, i. e. the stressed skin, is omitted. Instead, use of a specific continuous skin arrangement with integrated viscoelastic layers is made for realizing the stressed skin. Accordingly, the stressed skin represents a compound skin with respective viscoelastic layers being a part of it.

The viscoelastic layers are preferably composed of viscoelastic material that may comprise any kind of elastomeric rubber material, such as EPDM (ethylene-propylene-diene rubber), EVA (ethylene-vinyl acetate rubber), FPM (fluorine rubber). Advantageously, such an elastomeric material provides for additional thermal insulation of the compound skin.

Furthermore, specific elastomeric materials are tailored for outstanding fire resistance capabilities. In case of using those materials, both fire-resistance and acoustic behavior can be improved simultaneously. This is much more interesting for helicopter applications, since parts of a respective upper deck of a given fuselage require fire-resistance capabilities due to their proximity to respective engines. Therefore, a compound skin with titanium sheets represents a promising configuration.

More specifically, this compound skin is preferably composed of an inner stressed load-carrying skin, an outer stressed skin and a viscoelastic layer sandwiched between both skins. Separation of a monolithic skin into two portions, i. e. outer and inner skins, improves a respective fatigue resistance and a respective buckling resistance of the compound skin of the structural stiffened panel.

Advantageously, the viscoelastic layer is included within the stressed skin and, hence, within an underlying structural load path, consequently acting at the source of vibration and noise. In addition, the elastomeric layer is fully protected by the inner and outer skins. Thus, it is not subjected to direct environmental effects that could negatively affect its long-term damping behavior and adhesion to respective surrounding components. Furthermore, an underlying thermal stability of the elastomeric material is considerably increased within an oxygen-free environment which enables arrangement and operation of the structural stiffened panel within hot structural locations, e. g. of a respective airframe.

Both of the inner and outer skins may either comprise metal and/or fiber reinforced polymers. A predetermined thickness of the skins is preferentially identical in order to avoid different raw materials and for taking advantage of a maximum effective inertia of the compound skin with regard to its buckling resistance.

Preferably, the inventive compound skin defines several bays of the structural stiffened panel. Stiffening elements of a respective stiffening framework, such as stringers and frames, are preferentially directly riveted to the compound skin, thereby delimiting the bays. The elastomeric layer preferably covers almost fully each bay between stiffeners and frames, hence, providing for an optimal coverage ratio and optimal noise attenuation capabilities.

Advantageously, the viscoelastic layer increases a given distance between the inner and outer skins and, hence, their moments of inertia, which translates to an increase of an underlying bending stiffness and a buckling resistance of each bay. The increase of bending stiffness due to the viscoelastic layer opens the possibility to use steel foil as skin material for fire-resistance applications, which reduces material costs in comparison to titanium.

However, the increase of an underlying bending stiffness and a buckling resistance of each bay diminishes to a certain extent or even turns to a negative impact on the bending stiffness of the stressed skin as a result of a low shear stiffness and an associated shear deformation of the viscoelastic layer of the compound skin. The impact of the viscoelastic layer on a respective stability behavior of the stressed skin is a function of the shear stiffness, which is temperature dependant, and a thickness of the viscoelastic layer. Increasing the thickness and shear compliance of the viscoelastic layer considerably reduces the effective bending stiffness of the compound skin, despite of increasing the distance between the inner and outer skins. It should, however, be noted that for a certain shear stiffness of the viscoelastic layer and individual skin thicknesses of about 0.25 mm, the specific stiffness of the stressed skin, i. e. an underlying ratio of an effective bending stiffness against a total areal weight, becomes about 10% larger in comparison to a monolithic skin with similar buckling resistance. This leads to an overall weight saving potential of a structural arrangement with integrated damping characteristics in comparison to purely structural arrangements without any kind of damping. Since additional adhesive damping patches or pads are superfluous, further overall weight savings are possible.

In order to eliminate an underlying problem associated with riveting through viscoelastic material, intermediate elements, preferably interleaf stripes of composite plies, are sandwiched between both inner and outer skins in respective attachment areas, where the riveting takes place.

The interleaf stripes preferably comprise fiber reinforced polymers with any kind of reinforcement fibers, such as glass, carbon, aramid and so on. The interleaf stripes are preferentially automatically cut from pre-impregnated foils.

Advantageously, the interleaf stripes that are preferably made of unidirectional composite material support a main structural duty of the stringers by increasing their longitudinal and bending stiffness. The interleaf stripes are allocated within the working skin in a post-buckling regime, hence, increasing an effective column buckling strength of the stringer. As a result, and considering the large specific stiffness of unidirectional composite material, a given cross section of the stringer can be reduced, further leading to secondary weight saving potentials.

A resulting nominal thickness of the composite plies is preferably identical to a thickness of the viscoelastic layer. For a typical construction of a semi-monocoque panel with stringers—oriented longitudinal to a predominant load direction in operation—and frames—oriented orthogonally to the stringers—, the interleaf stripes exhibit an orthogrid lay-up with longitudinal and transverse portions. The viscoelastic material is placed at each field delimited by the longitudinal and transverse portions, i. e. the bays. Therein, each viscoelastic layer abuts to an associated interleaf stripe at an abutting interface. The longitudinal portions of the interleaf stripes preferably correspond to respective stringer locations and are preferentially composed of unidirectional composite plies that are longitudinally oriented with respect to the stringer's longitudinal extension.

Advantageously, the inventive compound skin is pre-manufactured with the viscoelastic layer and the interleaf stripes being simultaneously co-cured. An applied definition of respective rubber material that is used for implementing the viscoelastic layer is preferentially specified according to required damping characteristics and a compatibility to applied curing characteristics of resin and composite material that is used for implementing the interleaf stripes.

The manufacturing is preferably accomplished by means of pressure molding techniques. More specifically, the compound skin composed of skins, interleaf stripes and viscoelastic layers is preferentially pressed and heated until complete consolidation of both, the viscoelastic layer and the interleaf stripes.

According to a preferred embodiment, the at least one intermediate core element is arranged in an attachment area between the inner skin and the outer skin, the inner skin being rigidly attached via the at least one intermediate core element to the outer skin in the attachment area.

According to a further preferred embodiment, the at least one intermediate core element comprises a grid of longitudinal components and transversal components that define at least one intermediate free space, the at least one viscoelastic core element being arranged in the at least one intermediate free space.

According to a further preferred embodiment, the stiffening framework comprises a grid of stringers and frames that are rigidly attached to the stressed skin in the attachment area, the stringers and frames delimiting at least partly the at least one intermediate free space.

According to a further preferred embodiment, the stringers and frames are arranged on the inner skin in the attachment area and rigidly attached to the inner skin, the at least one intermediate core element and the outer skin by means of associated attachment means.

According to a further preferred embodiment, the at least one intermediate core element comprises fiber reinforced polymeric compounds.

According to a further preferred embodiment, the fiber reinforced polymeric compounds comprise carbon and/or glass and/or aramid fibers.

According to a further preferred embodiment, the longitudinal components comprise fibers that are essentially oriented along a longitudinal extension of the stringers and/or that the transversal components comprise fibers that are essentially oriented along a longitudinal extension of the frames.

According to a further preferred embodiment, at least one of the inner skin and the outer skin comprises metallic material.

According to a further preferred embodiment, at least one of the inner skin and the outer skin comprises fiber reinforced polymeric compounds.

According to a further preferred embodiment, the at least one viscoelastic core element comprises a damping loss factor of at least 5% at room temperature and 1 kHz excitation frequency.

According to a further preferred embodiment, the at least one viscoelastic core element comprises rubber material.

According to a further preferred embodiment, the rubber material comprises ethylene-propylene-diene rubber, ethylene-vinyl acetate rubber and/or fluorine rubber.

According to a further preferred embodiment, a respective thickness of the at least one viscoelastic core element corresponds at least essentially to a respective thickness of the at least one intermediate core element.

According to a further preferred embodiment, the respective thickness is comprised in-between 0.1 mm and 2 mm.

BRIEF DESCRIPTION OF THE DRAWINGS

Preferred embodiments of the invention are outlined by way of example in the following description with reference to the attached drawings. In these attached drawings, identical or identically functioning components and elements are labelled with identical reference numbers and characters and are, consequently, only described once in the following description.

DETAILED DESCRIPTION OF THE INVENTION

Figure 1:
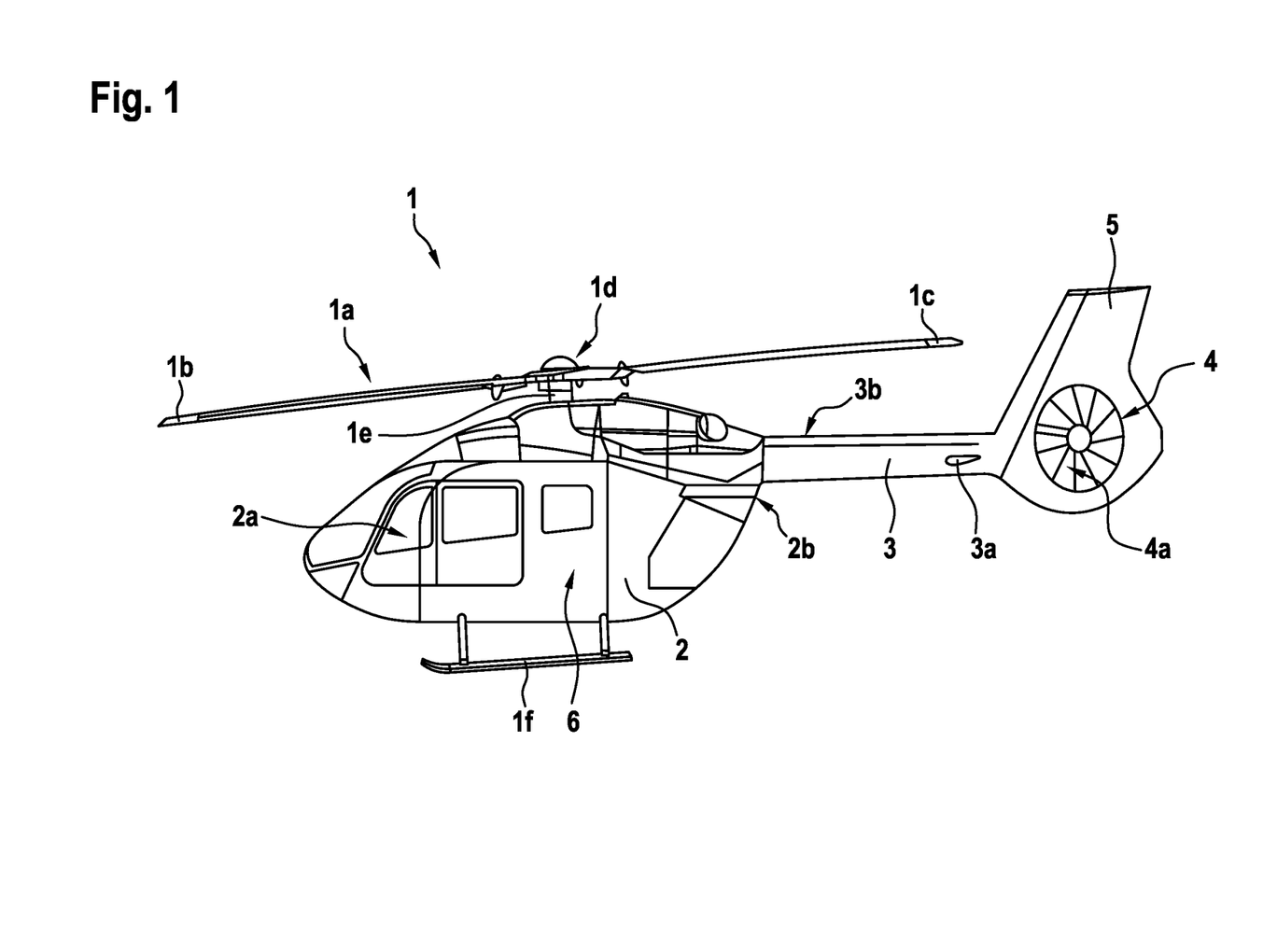
FIG. 1 shows a lateral view of a helicopter with a fuselage that comprises a structural stiffened panel according to the invention.

FIG. 1 shows an aircraft 1 that is exemplarily illustrated as a rotary wing aircraft and, more particularly, as a helicopter. Thus, for purposes of simplicity and clarity, the aircraft 1 is hereinafter referred to as the "helicopter" 1.

Illustratively, the helicopter 1 comprises a fuselage 2 that is connected to a landing gear 1f and defines a cabin 2a and a rear fuselage 2b. The rear fuselage 2b is connected to a tail boom 3.

According to one aspect, the fuselage 2 is at least partly implemented on the basis of a semi-monocoque design and comprises at least one skin-stiffened panel, i. e. at least one structural stiffened panel 6. The latter is exemplarily and representatively described in detail below with respect to FIG. 2 to FIG. 4.

Illustratively, the helicopter 1 further comprises at least one multi-blade main rotor 1a for providing lift and forward or backward thrust during operation. The at least one multi-blade main rotor 1a comprises a plurality of rotor blades 1b, 1c that are mounted at an associated rotor head 1d to a rotor shaft 1e, which rotates in operation of the helicopter 1 around an associated rotor axis.

By way of example, the helicopter 1 further comprises at least one preferentially shrouded counter-torque device 4 configured to provide counter-torque during operation, i. e. to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5. Illustratively, the tail boom 3 is also provided with a suitable horizontal stabilizer 3a.

Preferably, the tail boom 3 is a composite tail boom, i. e. a tail boom that comprises composite material and that is preferably at least essentially manufactured from composite material. Illustratively, the composite tail boom 3 is preferably implemented as a slim beam element that comprises at least partly a tail boom cone 3b, which is preferably tubular. In other words, the composite tail boom 3 is preferentially a closed structure with a nearly circular cross section.

Figure 2:
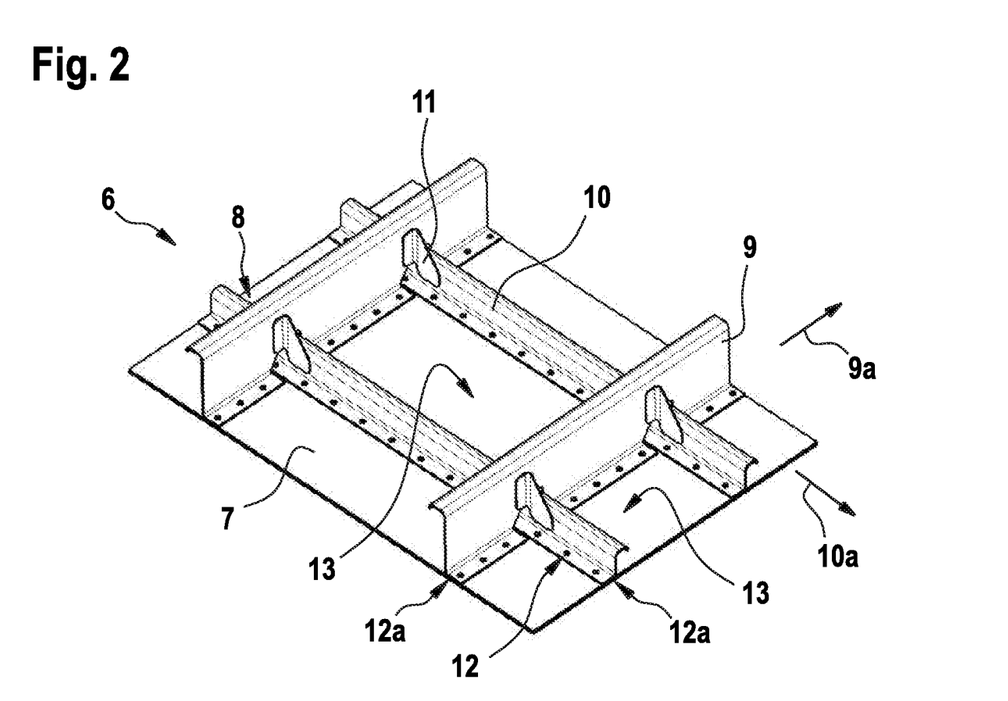
FIG. 2 shows a perspective view of the structural stiffened panel of FIG. 1.

FIG. 2 shows the structural stiffened panel 6 of FIG. 1. The structural stiffened panel 6 preferably comprises a stressed skin 7 and a stiffening framework 8 that is rigidly attached to the stressed skin 7. More specifically, the stiffening framework 8 is preferentially rigidly attached by means of suitable attachment means 12 to the stressed skin 7 in respective attachment areas 12a. The attachment means 12 are preferably rivets, however, alternative attachment means such as e. g. screws or bolts or even bonding may likewise be employed.

According to one aspect, the stiffening framework 8 comprises a grid of frames 9 and stringers 10 that are respectively rigidly attached to the stressed skin 7 in the attachment areas 12a. The frames 9 exhibit longitudinal extensions that are preferably oriented along a transversal direction 9a of the rotary wing aircraft 1 of FIG. 1, i. e. a direction that is transverse to a forward flight direction of the rotary wing aircraft 1 of FIG. 1. The stringers 10 exhibit longitudinal extensions that are preferably oriented along a longitudinal direction 10a of the rotary wing aircraft 1 of FIG. 1, i. e. a direction that is at least approximately in parallel to a forward flight direction of the rotary wing aircraft 1 of FIG. 1.

It should be noted that the structural stiffened panel 6 illustratively comprises two frames 9 and two stringers 10, from which only a single frame and a single stringer are exemplarily and representatively labelled with the reference sign 9, 10, respectively, for clarity and simplicity of the drawings. However, the structural stiffened panel 6 may comprise multiple frames 9 and/or stringers 10.

Preferably, the frames 9 are connected to the stringers 10 by means of suitable interconnecting elements 11. The frames 9 and stringers 10 preferably delimit at least partly at least one intermediate free space 13, which is also referred to as "bay" in the context of the present description. Preferably, the structural stiffened panel comprises multiple bays 13, each of which is at least partly delimited by associated frames 9 and stringers 10.

Figure 3:
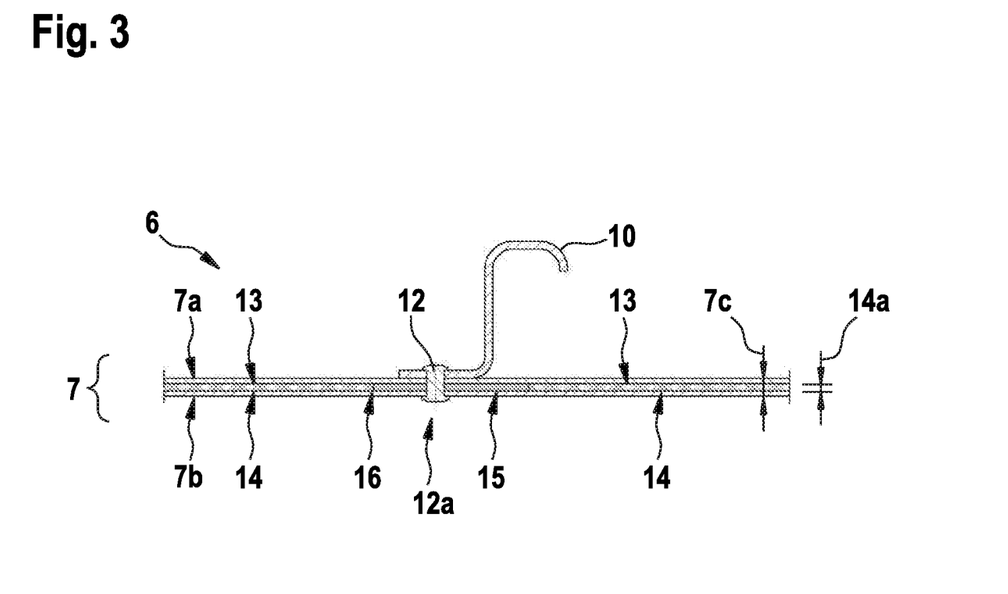
FIG. 3 shows a sectional view of the structural stiffened panel of FIG. 2.

FIG. 3 shows the structural stiffened panel 6 of FIG. 2 with the stressed skin 7 and the stringer 10 of the stiffening framework 8 of FIG. 2, for illustrating a preferred construction of the stressed skin 7. The stringer 10 is illustratively attached to the stressed skin 7 in the attachment areas 12a by means of the attachment means 12 of FIG. 2, which is exemplarily embodied as a rivet.

According to one aspect, the stressed skin 7 exhibits an illustrative thickness 7c and comprises an inner skin 7a and an outer skin 7b, as well as at least one viscoelastic core element 14 and at least one intermediate core element 15. The at least one viscoelastic core element 14 and the at least one intermediate core element 15 are preferably arranged between the inner skin 7a and the outer skin 7b, so that the stressed skin 7 is exemplarily embodied as a compound skin.

At least one of the inner skin 7a and the outer skin 7b may comprise metallic material. Alternatively, or in addition, at least one of the inner skin 7a and the outer skin 7b may comprise fiber reinforced polymeric compounds.

The at least one viscoelastic core element 14 is preferably provided for noise and vibration damping and, preferentially, arranged in the bay 13 of FIG. 2. According to one aspect, the at least one viscoelastic core element 14 comprises a damping loss factor of at least 5% at room temperature and 1 kHz excitation frequency. Preferably, the at least one viscoelastic core element 14 comprises rubber material, which may comprise ethylene-propylene-diene rubber, ethylene-vinyl acetate rubber and/or fluorine rubber.

Illustratively, a respective thickness 14a of the at least one viscoelastic core element 14 corresponds at least essentially to a respective thickness of the at least one intermediate core element 15. The thickness 14a is preferably comprised in-between 0.1 mm and 2 mm and, preferentially, constant all over the stressed skin 7. Preferentially, the thickness 14a is not greater than half of the thickness 7c of the stressed skin 7.

The at least one intermediate core element 15 preferably comprises fiber reinforced polymeric compounds. The fiber reinforced polymeric compounds may comprise carbon and/or glass and/or aramid fibers, or any other suitable and applicable fibers.

By way of example, two viscoelastic core elements 14 are shown. Each viscoelastic core element 14 preferably abuts against the at least one intermediate core element 15 at an associated abutting interface, preferentially by means of a simple butt joint. However, for simplicity and clarity of the drawings only a single abutting interface is labelled with the reference sign 16.

However, it should be noted that scarfed or overlapped configurations are likewise possible in order to avoid a sharp abutting interface or even voids during manufacturing. The butt joint is, nevertheless, not deemed problematic in mechanical terms, since it does not represent a sharp change in skin bending stiffness regarding a low transverse bending stiffness of a transversal component (15b in FIG. 4) of the at least one intermediate core element 15 with plies oriented in longitudinal direction.

Figure 4:
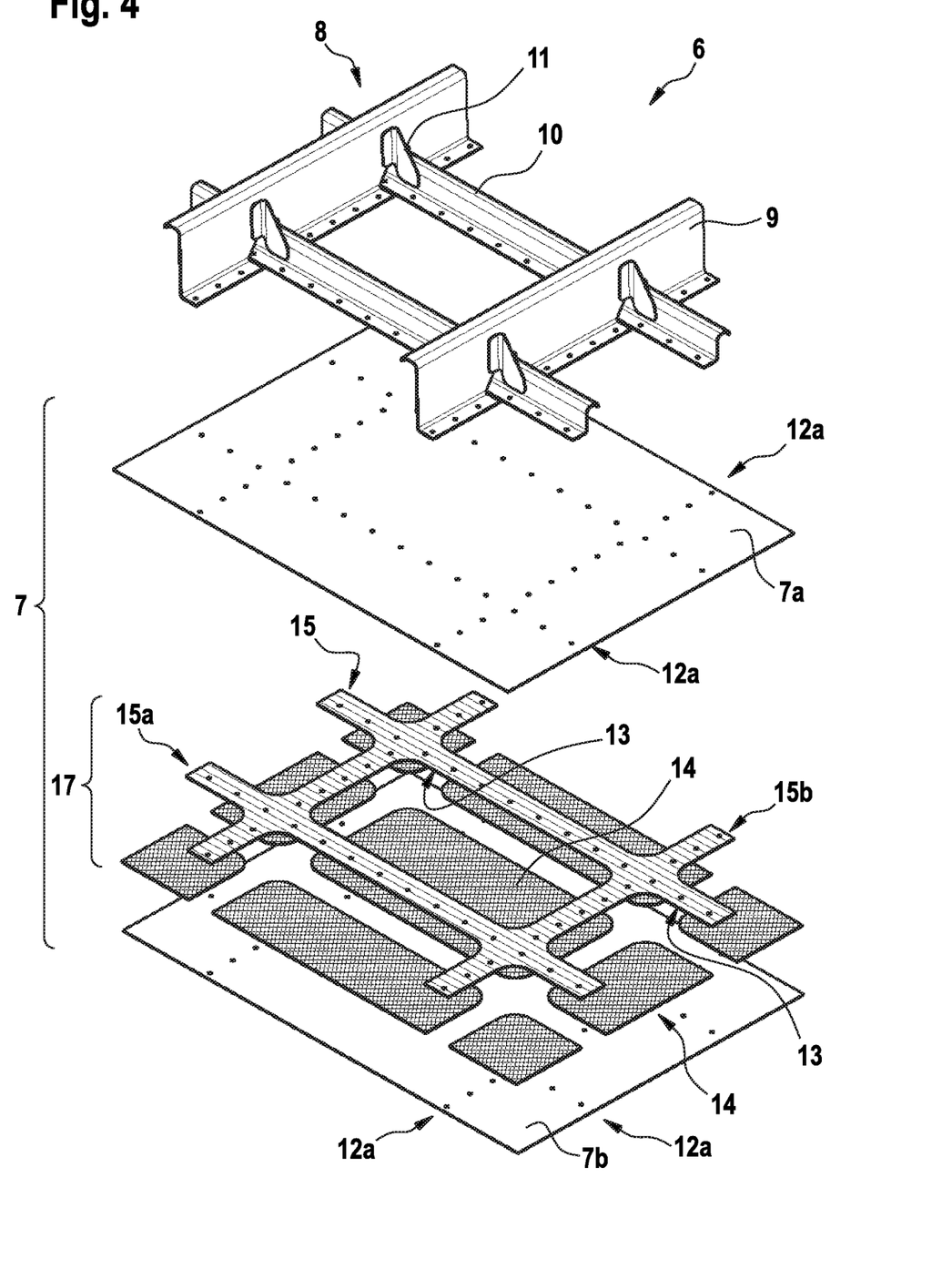
FIG. 4 shows an exploded view of the structural stiffened panel of FIG. 2.

FIG. 4 shows the structural stiffened panel 6 of FIG. 2 and FIG. 3 with the stressed skin 7 and the stiffening framework 8. The latter illustratively comprises the grid of frames 9 and stringers 10 of FIG. 2, which are interconnected by means of the interconnecting elements 11 of FIG. 2.

As described above, the stressed skin 7 comprises the inner skin 7a and the outer skin 7b, as well as at least one viscoelastic core element 14 and at least one intermediate core element 15 of FIG. 3. The at least one viscoelastic core element 14 and the at least one intermediate core element 15 illustratively define a core element assembly 17, which is illustratively sandwiched between the inner and outer skins 7a, 7b.

More specifically, the at least one intermediate core element 15 preferably comprises a grid of longitudinal components 15a and transversal components 15b that define the at least one intermediate free space 13 of FIG. 2, i. e. the bay 13. Preferentially, the longitudinal components 15a comprise fibers that are essentially oriented along a longitudinal extension of the stringers 10 and/or the transversal components 15b comprise fibers that are essentially oriented along a longitudinal extension of the frames 9.

By way of example, the intermediate core element 15 comprises two longitudinal components 15a and two transversal components 15b, which illustratively define an orthogrid pattern. However, for simplicity and clarity of the drawings only a single longitudinal component and a single transversal component are labelled with the respective reference sign 15a, 15b.

The longitudinal components 15a and the transversal components 15b exemplarily delimit at least partly a plurality of bays. Illustratively, nine bays are at least partly delimited, from which only two bays are labelled with the reference sign 13, for simplicity and clarity of the drawings.

Each bay 13 is preferably provided with an associated viscoelastic core element 14. Accordingly, nine viscoelastic core elements are illustrated, from which only two viscoelastic core elements are labelled with the reference sign 14, for simplicity and clarity of the drawings.

According to one aspect, the at least one viscoelastic core element 14 and the at least one intermediate core element 15, i. e. exemplarily the nine viscoelastic core elements 14 in FIG. 4, the longitudinal components 15a and the transversal components 15b, are tessellated, i. e. form together a tessellated geometrical arrangement. In the context of the present invention, the term "tessellated" refers to a tiling of the space provided between the inner and outer skins 7a, 7b by means of the viscoelastic core element 14 and the at least one intermediate core element 15. The viscoelastic core element 14 and the at least one intermediate core element 15 are, hence, organized between the inner and outer skins 7a and 7b in a geometric pattern of mutually abutting frames with no gaps and no entire overlap, one frame being the at least one intermediate core element 15 and the second frame being the viscoelastic core element 14. In other words, the longitudinal components 15a and the transversal components 15b define a grid-like configuration with regular openings, which are entirely covered by individual viscoelastic core elements 14. This configuration may be chessboard-like.

According to one aspect, the at least one intermediate core element 15, i. e. its longitudinal and transversal components 15a, 15b, is/are arranged in the attachment area 12a of FIG. 2 between the inner skin 7a and the outer skin 7b. Thus, the inner skin 7a is preferably rigidly attached via the at least one intermediate core element 15, i. e. its longitudinal and transversal components 15a, 15b, to the outer skin 7b in the attachment area 12a by means of the attachment means 12 of FIG. 2 and FIG. 3.

Furthermore, the stiffened framework 8, i. e. its stringers 10 and frames 9 are preferably arranged on the inner skin 7a in the attachment area 12a and rigidly attached to the inner skin 7a, the at least one intermediate core element 15, i. e. its longitudinal and transversal components 15a, 15b, and the outer skin 7b by means of the attachment means 12. The stringers 10 are illustratively arranged above the longitudinal components 15a and the frames above the transversal components 15b, such that the attachment means 12 do not clamp any one of the viscoelastic core elements 14.

It should be noted that modifications to the above described embodiments are within the common knowledge of the person skilled in the art and, thus, also considered as being part of the present invention. In particular, it should be noted that the inventive structural stiffened panel 6 according to FIG. 1 to FIG. 4, which is preferably implemented as an integral skin-stiffened panel in semi-monocoque structure, is only exemplarily and illustratively shown and described with respect to an application in a rotary wing aircraft, i. e. the helicopter 1 of FIG. 1. However, the inventive structural stiffened panel can likewise be adapted to application in other aircrafts, in particular in fixed wing aircrafts. Such an adaptation falls within the common knowledge of the person skilled in the art, who may simply apply the above described teachings that are explained with respect to an integral skin-stiffened panel in semi-monocoque structure for a rotary wing aircraft to an integral skin-stiffened panel in semi-monocoque structure for a fixed wing aircraft.

REFERENCE LIST 1 rotary wing aircraft
1a multi-blade main rotor
1b, 1c rotor blades
1d rotor head
1e rotor shaft
1f landing gear
2 fuselage
2a cabin
2b rear fuselage
3 tail boom
3a horizontal stabilizer
3b tail boom cone
4 counter-torque device
4a tail rotor
5 fin
6 structural stiffened panel
7 stressed skin
7a inner skin
7b outer skin
7c stressed skin thickness
8 stiffening framework
9 frame
9a transversal direction
10 stringer
10a longitudinal direction
11 interconnecting element
12 attachment means
12a attachment areas
13 bay
14 viscoelastic core element
14a viscoelastic core element thickness
15 intermediate core element
15a intermediate core element longitudinal component
15b intermediate core element transversal component
16 abutting interface
17 core element assembly

What is claimed is:

1. A rotary wing aircraft with a fuselage that comprises at least one structural stiffened panel, the structural stiffened panel comprising a stressed skin and a stiffening framework that is rigidly attached to the stressed skin, wherein the stressed skin comprises an inner skin, an outer skin and a core element assembly arranged between the inner skin and the outer skin, the core element assembly comprising at least one viscoelastic core element and at least one intermediate core element that are tessellated, wherein the at least one viscoelastic core element is provided for noise and vibration damping, the at least one intermediate core element arranged in an attachment area between the inner skin and the outer skin, the inner skin rigidly attached via the at least one intermediate core element to the outer skin in the attachment area, and the at least one intermediate core element comprising a grid of longitudinal components and transversal components that define at least one intermediate free space, the at least one viscoelastic core element arranged in the at least one intermediate free space.

2. The rotary wing aircraft of claim 1, wherein the stiffening framework comprises a grid of stringers and frames rigidly attached to the stressed skin in the attachment area, the stringers and frames delimiting at least partly the at least one intermediate free space.

3. The rotary wing aircraft of claim 2, wherein the stringers and frames are arranged on the inner skin in the attachment area and rigidly attached to the inner skin, the at least one intermediate core element and the outer skin by means of associated attachment means.

4. The rotary wing aircraft of claim 2, wherein the at least one intermediate core element comprises fiber reinforced polymeric compounds.

5. The rotary wing aircraft of claim 4, wherein the fiber reinforced polymeric compounds comprise at least one of carbon, glass or aramid fibers.

6. The rotary wing aircraft of claim 4, wherein at least one of i) the longitudinal components comprise fibers that are essentially oriented along a longitudinal extension of the stringers or ii) the transversal components comprise fibers that are essentially oriented along a longitudinal extension of the frames.

7. The rotary wing aircraft of claim 1, wherein at least one of the inner skin and the outer skin comprises metallic material.

8. The rotary wing aircraft of claim 1, wherein at least one of the inner skin and the outer skin comprises fiber reinforced polymeric compounds.

9. The rotary wing aircraft of claim 1, wherein the at least one viscoelastic core element comprises a damping loss factor of at least 5% at room temperature and 1 kHz excitation frequency.

10. The rotary wing aircraft of claim 1, wherein the at least one viscoelastic core element comprises rubber material.

11. The rotary wing aircraft of claim 1, wherein the rubber material comprises at least one of ethylene-propylene-diene rubber, ethylene-vinyl acetate rubber or fluorine rubber.

12. The rotary wing aircraft of claim 1, wherein a respective thickness of the at least one viscoelastic core element corresponds at least essentially to a respective thickness of the at least one intermediate core element.

13. The rotary wing aircraft of claim 1, wherein the respective thickness is comprised in-between 0.1 mm and 2 mm.

14. A rotary wing aircraft with a fuselage that comprises at least one structural stiffened panel, the structural stiffened panel comprising a stressed skin and a stiffening framework that is rigidly attached to the stressed skin, wherein the stressed skin comprises an inner skin, an outer skin and a core element assembly arranged between the inner skin and the outer skin, the core element assembly comprising at least one viscoelastic core element and at least one intermediate core element that are tessellated, the at least one intermediate core element arranged in an attachment area between the inner skin and the outer skin, the inner skin rigidly attached via the at least one intermediate core element to the outer skin in the attachment area, and the at least one intermediate core element comprising a grid of longitudinal components and transversal components that define at least one intermediate free space, the at least one viscoelastic core element arranged in the at least one intermediate free space.

15. The rotary wing aircraft of claim 14, wherein the stiffening framework comprises a grid of stringers and frames rigidly attached to the stressed skin in the attachment area, the stringers and frames delimiting at least partly the at least one intermediate free space.

16. The rotary wing aircraft of claim 15, wherein the stringers and frames are arranged on the inner skin in the attachment area and rigidly attached to the inner skin, the at least one intermediate core element and the outer skin.

17. The rotary wing aircraft of claim 15, wherein the at least one intermediate core element comprises fiber reinforced polymeric compounds.

18. The rotary wing aircraft of claim 17,
wherein the fiber reinforced polymeric compounds comprise at least one of carbon, glass or aramid fibers.

19. The rotary wing aircraft of claim 14, wherein at least one of the inner skin and the outer skin comprises metallic material.

20. The rotary wing aircraft of claim 14, wherein at least one of the inner skin and the outer skin comprises fiber reinforced polymeric compounds.

* * * * *